United States Patent
Agrawal et al.

(10) Patent No.: US 12,244,451 B2
(45) Date of Patent: Mar. 4, 2025

(54) SYSTEM FOR DETERMINING MASS OUTAGE AND METHOD OF USING

(71) Applicant: Rakuten Mobile, Inc., Tokyo (JP)

(72) Inventors: Nimit Agrawal, Madhya Pradesh (IN); Abhishek Kumar Mishra, Madhya Pradesh (IN)

(73) Assignee: RAKUTEN MOBILE, INC., Tokyo (JP)

( * ) Notice: Subject to any disclaimer, the term of this patent is extended or adjusted under 35 U.S.C. 154(b) by 0 days.

(21) Appl. No.: 17/629,781

(22) PCT Filed: Dec. 30, 2021

(86) PCT No.: PCT/US2021/065627
§ 371 (c)(1),
(2) Date: Jan. 25, 2022

(87) PCT Pub. No.: WO2023/129159
PCT Pub. Date: Jul. 6, 2023

(65) Prior Publication Data
US 2024/0039780 A1    Feb. 1, 2024

(51) Int. Cl.
*H04L 41/0604*    (2022.01)
*H04L 41/50*    (2022.01)
*H04L 43/16*    (2022.01)

(52) U.S. Cl.
CPC ...... *H04L 41/0604* (2013.01); *H04L 41/0613* (2013.01); *H04L 41/5032* (2013.01); *H04L 43/16* (2013.01)

(58) Field of Classification Search
CPC . H04L 41/06; H04L 41/0604; H04L 41/0609; H04L 41/0613; H04L 41/0618; H04L 41/0631; H04L 41/065; H04L 41/0677; H04L 41/0681; H04L 43/06; H04L 43/065; H04L 43/16; H04W 24/04
See application file for complete search history.

(56) References Cited

U.S. PATENT DOCUMENTS

7,542,428 B1 * 6/2009 Johnson ............... H04L 41/064
370/242
9,876,674 B1 * 1/2018 Murray ................ H04W 24/04
(Continued)

*Primary Examiner* — Vivek Srivastava
*Assistant Examiner* — William C McBeth
(74) *Attorney, Agent, or Firm* — HAUPTMAN HAM, LLP (57) ABSTRACT

A system includes a non-transitory computer readable medium configured to store instructions thereon; and a processor. The processor is configured to receive alarm data related to equipment in a telecommunication network. The processor is configured to receive a correlation rule and a mass outage rule, wherein each mass outage rule is associated with a correlation rule. The processor is configured to perform a first aggregation using the alarm data based on domain, vendor, equipment type, classification, or geographic information; and associate the aggregated alarm data with a corresponding correlation rule. The processor is configured to determine a number of pieces of equipment that are associated with each correlation rule; determine whether the determined number is equal to or greater than a threshold value; and generate an incident report in response to the number of pieces of equipment being equal to or greater than the at least one threshold value.

17 Claims, 5 Drawing Sheets

(56) References Cited

U.S. PATENT DOCUMENTS

| | | | |
|---|---|---|---|
| 10,880,185 B1* | 12/2020 | Hermoni | H04L 41/0609 |
| 2003/0135382 A1* | 7/2003 | Marejka | H04L 43/16 |
| | | | 714/100 |
| 2008/0089225 A1* | 4/2008 | Ammay | H04L 41/0681 |
| | | | 370/216 |
| 2008/0181099 A1* | 7/2008 | Torab | H04L 41/0631 |
| | | | 370/216 |
| 2009/0245094 A1* | 10/2009 | Russell | H04L 41/069 |
| | | | 370/216 |
| 2009/0262650 A1* | 10/2009 | Shaikh | H04L 41/0631 |
| | | | 370/242 |
| 2011/0032260 A1* | 2/2011 | Duggan | H04L 41/0604 |
| | | | 707/E17.014 |
| 2011/0119517 A1* | 5/2011 | Beeco | H04L 41/0677 |
| | | | 713/340 |
| 2011/0145711 A1* | 6/2011 | Njemanze | G06F 21/552 |
| | | | 709/224 |
| 2013/0257623 A1* | 10/2013 | Bagasra | G08B 27/005 |
| | | | 340/657 |
| 2013/0290783 A1* | 10/2013 | Bowler | H04L 41/0609 |
| | | | 714/25 |
| 2015/0254969 A1* | 9/2015 | Bishop | H04L 41/0618 |
| | | | 340/506 |
| 2016/0295426 A1* | 10/2016 | Gormley | H04W 24/02 |
| 2017/0310541 A1* | 10/2017 | Jin | H04L 41/0631 |
| 2017/0317873 A1 | 11/2017 | Hévizi et al. | |
| 2018/0091528 A1* | 3/2018 | Shahbaz | H04L 63/1458 |
| 2018/0152338 A1* | 5/2018 | Panigrahi | H04L 41/0604 |
| 2019/0081850 A1* | 3/2019 | Nazar | H04L 41/0631 |
| 2019/0124523 A1 | 4/2019 | Harrang et al. | |
| 2021/0152584 A1* | 5/2021 | Chakravarty | H04W 24/04 |
| 2022/0107858 A1* | 4/2022 | Jain | G06F 11/079 |
| 2022/0156154 A1* | 5/2022 | Varnavas | G06F 11/3409 |
| 2022/0217550 A1* | 7/2022 | Sakamoto | H04W 24/04 |
| 2023/0069434 A1* | 3/2023 | Cheng | H04L 41/0631 |
| 2023/0116748 A1* | 4/2023 | Rowe | H04L 41/0681 |
| | | | 709/224 |
| 2023/0214287 A1* | 7/2023 | Ionescu | G06F 11/079 |
| | | | 714/57 |
| 2024/0113932 A1* | 4/2024 | Castrogiovanni | H04L 41/0604 |

* cited by examiner

| Domain | Vendor | Classification | Equipment Type | Geography | Minor NE Affected Count | Major NE affected count | Critical NE Affected Count | Emergency NE Affected Count |
|---|---|---|---|---|---|---|---|---|
| RAN | Vendor 1 | Outage | Equipment Type 1 | Japan Colored | 50 | 50 | 50 | 50 |
| Transport | Vendor 2 | Deterioration | Equipment Type 2 | Prefecture | 15 | 20 | 300 | 900 |
| Core | Vendor 3 | Outage | Equipment Type 3 | Region | 13 | 34 | 400 | 800 |
| RAN | Vendor 1 | Outage | Equipment Type 1 | City | 19 | 26 | 350 | 550 |

SYSTEM FOR DETERMINING MASS OUTAGE AND METHOD OF USING

RELATED APPLICATIONS

The present application is a National Phase of International Application No. PCT/US2021/065627, filed Dec. 30, 2021.

BACKGROUND

Telecommunication networks are implemented using equipment located over a large geographic area. Alarms are generated when the equipment experiences a problem, such as a malfunction or a deterioration in performance. In some instances, wide-ranging events, such as engineering faults, natural disasters or other events, cause problems in a large number of equipment components across a geographic area. In some instances, these wide-ranging events cause damage to components, such as fiber optic cables, that connect the equipment to a datacenter. As a result, users of the telecommunication network are likely to experience slower upload and download speeds, which reduces customer satisfaction with a service provider.

These equipment problems generate alarms within the telecommunication network to be resolved by the service provider. In some approaches, alarms are generated based on users reporting issues with the telecommunication network. In some approaches, these alarms are addressed one at a time. For example, in some approaches, the alarms are addressed based on an order in which the alarms are received.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

The following disclosure provides many different embodiments, or examples, for implementing different features of the provided subject matter. Specific examples of components, values, operations, materials, arrangements, or the like, are described below to simplify the present disclosure. These are, of course, merely examples and are not intended to be limiting. Other components, values, operations, materials, arrangements, or the like, are contemplated. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Approaches that address alarms generated by problems with equipment in a telecommunication network one at a time rely on manual intervention in order to identify a common geographic area for the alarms. That is, a human network monitor would identify that a significant number of alarms are originating from equipment in a similar geographic area. A significant number of alarms within a geographic region is called a mass outage in some embodiments. Based on this identification by the network monitor, an incident report is generated in order to repair or replace equipment experiencing a problem. Relying on human intervention or recognition to determine whether a mass outage has occurred reduces response time to the mass outage and consumes more manpower to identify the mass outage. As a result, users of the telecommunication network are without service or have slower service within the impacted geographic area. The loss or reduction of service quality reduces customer satisfaction.

In order to maintain customer satisfaction and automatically identify mass outages, the current description includes a system in which a service provider is able to generate relationship rules between equipment in order to automatically identify mass outages and generate incident reports for repair or replacement of equipment within the telecommunication network. In some embodiments, the relationship rules are generated by a network monitor after installation of equipment is completed. In some embodiments, the relationship rules are generated by an installer at the time of installation of a piece of equipment. In some embodiments, the network monitor establishes the relationship rules prior to installation of a piece of equipment and the installer adds the piece of equipment to the relationship rules during the installation of the piece of equipment. In some embodiments, the relationship rules are based on at least one of domain of the telecommunication network, vendor information, equipment type, problem classification, or geographic location.

The system is able to receive alarms from the telecommunication system. The system is able to determine whether the alarm originated from a piece of equipment that has at least one relationship rule and aggregate the alarms within the telecommunication system based on the at least one relationship rule. Based on analysis of the alarms and predetermined relationship rules, the system is able to determine whether a mass outage has occurred. The system is also able to determine an importance level of the mass outage, such as minor, major, critical or emergency, based on a number of nodes impacted by the mass outage. The system is able to automatically generate an incident report based on the determined mass outage. In some embodiments, the system automatically transmits the incident report to one or more technicians for repair or replacement of equipment within the telecommunication network. In some embodiments, the system generates the incident report including an importance level of an identified mass outage. In some embodiments, the system is configured to automatically manage the incident report differently for different importance levels.

Figure 1:
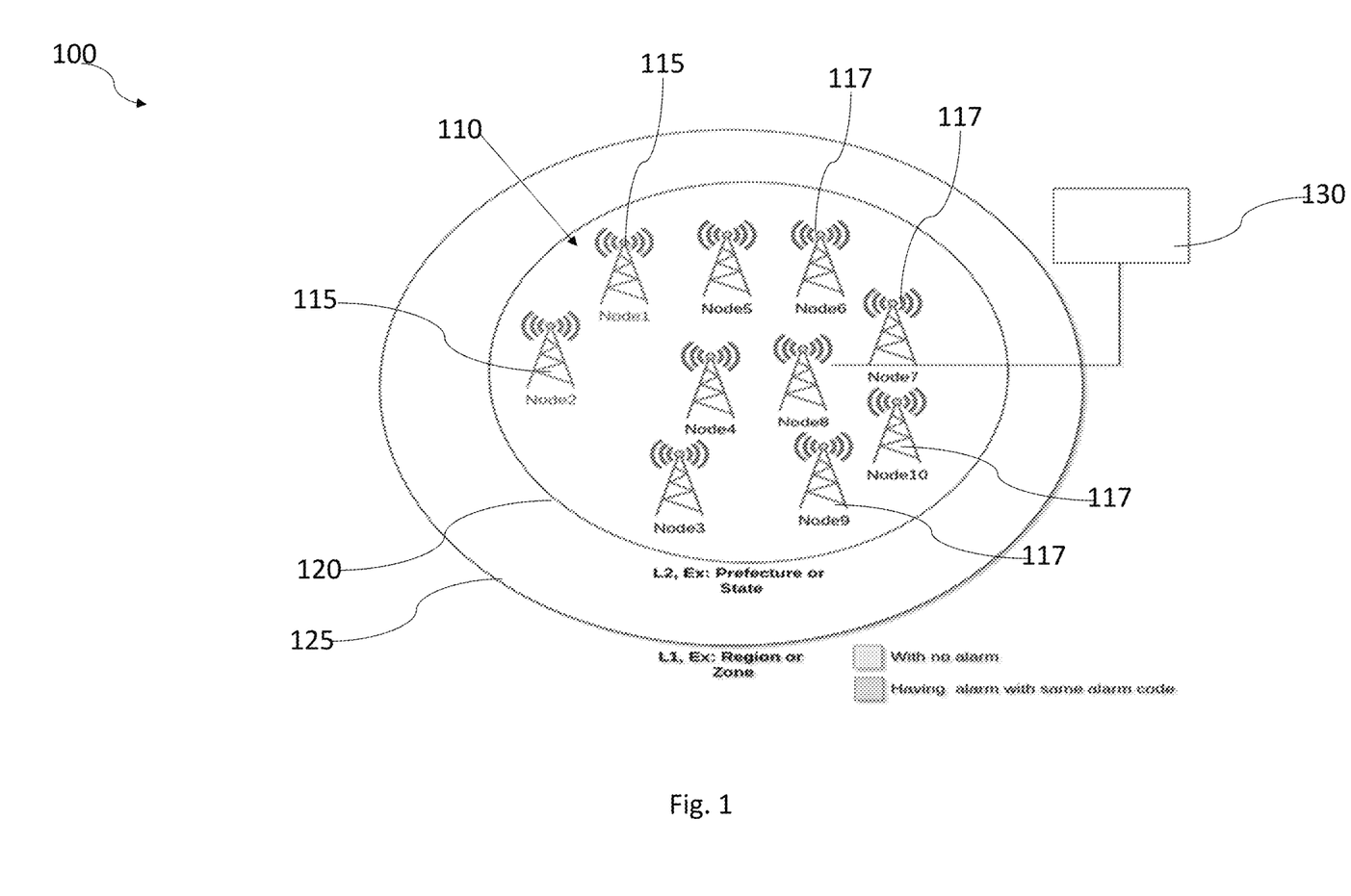
FIG. 1 is a schematic view of a telecommunication network in accordance with some embodiments.

FIG. 1 is a schematic view of a telecommunication network 100 in accordance with some embodiments. The telecommunication network 100 includes a plurality of nodes 110. The nodes 110 include nodes 115 having no alarms and nodes 117 having alarms with a same alarm code. An alarm code indicates a type of problem with the node. Based on the nodes 117 having a same alarm code, a system, such as a controller 130 or system 500 (FIG. 5) is able to identify a mass outage including the nodes 117. The nodes 110 are located within a first geographic area 120. The first geographic area 120 is within a second geographic area 125. While FIG. 1 does not include nodes in a space between a boundary of the first geographic area 120 and the second geographic area 130 for the sake of clarity of the drawing, one of ordinary skill would understand that in nodes would be present between the boundary of the first geographic area 120 and the second geographic area 125. The telecommunication network 100 further includes the controller 130 configured to monitor the performance of nodes 110. The controller 130 is configured to receive alarms from each of the nodes 110 and to provide communication with each of the nodes 110. The controller 130 is further configured to generate incident reports in response to the controller 130 determining that a mass outage exists within the nodes 110.

The nodes 110 include equipment, such as base stations, for implementing the telecommunication network 100. In some embodiments, each of the nodes 110 includes the same equipment. In some embodiments, at least one node 110 has different equipment from at least one other node 110. In some embodiments, at least one node 110 includes a nodeB base station. In some embodiments, at least one node 110 includes an evolved nodeB (eNodeB) base station. In some embodiments, at least one node 110 includes a gNodeB base station. In some embodiments, at least one node 110 includes a next-generation evolved NodeB (ng-eNodeB) base station. In some embodiments, at least one node 110 includes a different base station type from at least one other node 110.

In some embodiments, the nodes 110 include equipment such as routers, signaling protocols and switching (SPS) equipment, transceivers, mobility management entity (MME) equipment, carrier grade network address translation (CGNAT) equipment, or other suitable equipment. In some embodiments, at least one node 110 includes redundant equipment to provide a backup in response to the primary equipment failing. For example, in some embodiments, at least one node 110 includes a primary router and a redundant router. The primary router is used during normal operation; and when the primary router fails or experiences a problem, the redundant router is used to maintain operation of the node 110.

In some embodiments, equipment in each of the nodes 110 includes a correlation flag indicating a relationship to other nodes 110. In some embodiments, at least one piece of equipment in a node 110 does not include a correlation flag. The correlation flag indicates relationships between an alarm code associated with each of the nodes 110. In some embodiments, the correlation flag is stored in a library accessible by the controller 130. In some embodiments, the relationship between the alarm code and the correlation flag is stored in the library accessible by the controller 130. The correlation flag is established by generating a correlation rule for a piece of equipment. Each correlation rule includes a rule identification (ID) to differentiate correlation rules for different pieces of equipment. In some embodiments, the correlation flag is generated by an installer at the time the pieces of equipment is installed. In some embodiments, the correlation flag is generated by a network monitor after the piece of equipment is installed. In some embodiments, a piece of equipment includes a single correlation rule. In some embodiments, a piece of equipment includes multiple correlation rules, which are differentiated based on rule ID. Additional details for generating correlation rules is described below with respect to FIG. 3, in some embodiments.

The nodes 115 do not have any alarms pending in the arrangement of FIG. 1. In contrast, each of the nodes 117 has at least one alarm pending. The alarm includes an alarm code, which indicates both the equipment experiencing a problem as well as the type of problem experienced. For example, in some embodiments, the alarm code indicates that a router in a node 117 has a low battery. In some embodiments, the alarm code indicates that the router in the node 117 has a damaged port. The alarm codes are stored in a library accessible by the controller 130, so that the controller 130 is able to determine the equipment experiencing a problem and the problem experienced based on a received alarm code. In some embodiments, each of the nodes 117 is experiences a same problem. For examples, during a natural disaster, power to the nodes 117 is interrupted in some instances and batteries within the equipment of the nodes 117 are all low. In some embodiments, at least one node 117 is experiencing a different problem from at least one other node 117. The controller 130 is able to determine the problems for each node 117 based on the received alarm codes.

Each of the nodes 110 is within the first geographic area 120. In some embodiments, the first geographic area 120 represents a state or a prefecture. In some embodiments, the first geographic area 120 represents a city or a town. In some embodiments, the first geographic area 120 represents a portion of a city or a portion of a town. In some embodiments, the equipment in each of the nodes 110 is assigned a geographic location of the first geographic area 120 when the equipment is installed. In some embodiments, the equipment in each of the nodes 110 is assigned a geographic location based on instructions received from the controller 130. In some embodiments, the equipment in at least one node 110 retrieves geographic information indicating the first geographic area 120 from a neighboring node 110.

The second geographic area 125 is larger than the first geographic area 120 and encompasses the first geographic area 120. In some embodiments, the second geographic area 125 represents a region or zone. In some embodiments, the second geographic area 125 represents a state or a prefecture. In some embodiments, the second geographic area 125 represents a city or a town. In some embodiments, the second geographic area 125 represents a portion of a city or a portion of a town larger than a portion represented by the first geographic area 120. In some embodiments, the controller 130 is able to directly communicate with nodes in the second geographic area 125 other than nodes 110. In some embodiments, the controller 130 is limited to direct communication with the nodes 110. In some embodiments, the controller 130 is able to indirectly communicate with nodes in the second geographic area 125 other than nodes 110, such as through a data center.

The controller 130 is configured to receive alarms from the nodes 110. The controller 130 then determines whether any of the alarms are related to equipment which have one or more correlation flags. The controller 130 then aggregates alarms from equipment determined based on the correlation flags associated with the received alarms. Based on a number of alarms and the alarm codes, the controller 130 is able to determine whether a mass outage has occurred. In response to a determination that a mass outage has occurred, the controller 130 is able to generate one or more incident reports for repairing or replacement equipment associated with the determined mass outage. In some embodiments, the controller 130 is able to transmit the incident report, either wirelessly or through a wired connection, to repair and maintenance personnel. In some embodiments, the controller 130 transmits the incident report, either wirelessly or through a wired connection, to alert a network monitor to the mass outage. In some embodiments, the incident report includes an importance level of the mass outage. In some embodiments, the incident report includes recommended actions for addressing the mass outage. In some embodiments, the controller 130 performs different actions with respect to the incident report based on a determined importance level of the mass outage. Additional details of operations of the controller 130 are described below with respect to FIG. 2, in some embodiments.

Figure 2:
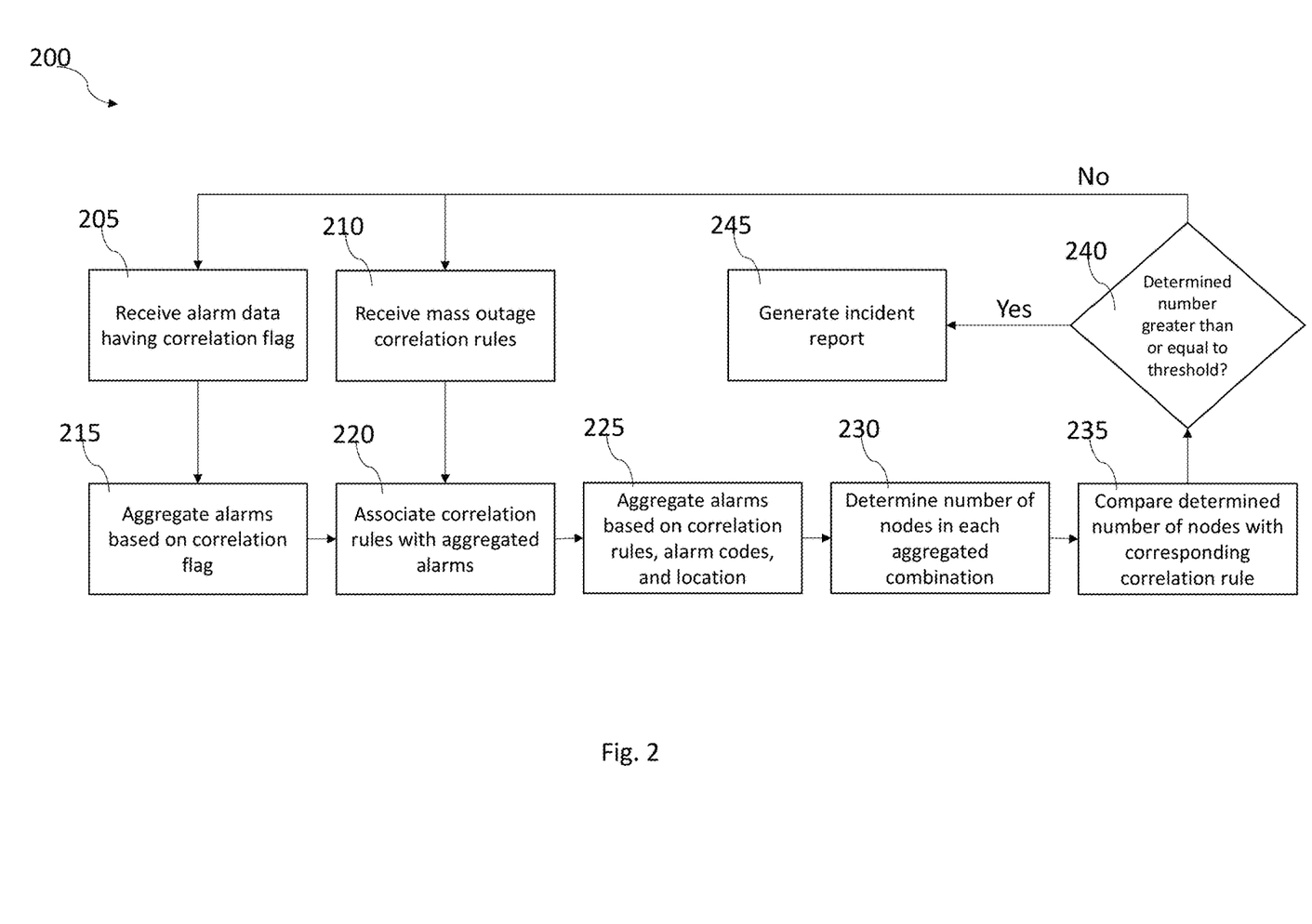
FIG. 2 is a flowchart of a method of determining a mass outage in accordance with some embodiments.

FIG. 2 is a flowchart of a method 200 of determining a mass outage in accordance with some embodiments. The method 200 is capable of being implemented using controller 130 (FIG. 1), system 500 (FIG. 5), or another suitable system. The method 200 determines whether a mass outage has occurred in a telecommunication network, such as telecommunication network 100 (FIG. 1), and generates an incident report in response to a determination that a mass outage has occurred.

In operation 205, alarm data having a correlation flag is received. The alarm includes information related to the equipment experiencing a problem as well as information related to the problem experienced, such as an alarm code. The correlation flag indicates a relationship between the equipment experiencing a problem and at least one other piece of equipment in the telecommunication network. In some embodiments, the alarm is received directly from the equipment experiencing the problem. In some embodiments, the alarm is received indirectly, such as through a data center. In some embodiments, the alarm is received wirelessly. In some embodiments, the alarm is received through a wired connection. Additional information related to the correlation flag are described below with respect to FIG. 3, in some embodiments.

In some embodiments, the operation 205 includes a further step of determining whether a received alarm has a correlation flag. That is, the alarm is received and then analyzed to determine whether the alarm has a correlation flag. In response to a determination that the alarm has a correlation flag, the method 200 proceeds to operation 215. In response to a determination that the alarm does not include a correlation flag, the method 200 repeats operation 205 until an alarm having a correlation flag is received.

In operation 210, mass outage and correlation rules are received. The mass outage rules include information related to importance level of a mass outage. The importance level information is predetermined by the network monitor. In some embodiments, the importance level information includes information related to a number of affected pieces of equipment for different importance levels. As a number of affected pieces of equipment increases, an importance level of the mass outage increases. In some embodiments, the importance level information includes predetermined threshold values set by the network monitor. The predetermined threshold values are set in order to efficiently balance repair/replacement effort with customer/user satisfaction with the telecommunication network. In some embodiments, the predetermined threshold values are set based on a number of nodes, e.g., nodes 110 (FIG. 1), with a geographic area, e.g., first geographic area 120 (FIG. 1). In some embodiments, the predetermined threshold values are set based on overlapping coverage areas of nodes, e.g., nodes 110 (FIG. 1).

The correlation rules identify relationships between equipment within the telecommunication network. The correlation rules are set by the network monitor based on key parameter indicators (KPIs) for the telecommunication system to determine what types of equipment relationships are likely to impact performance of the telecommunication network. Additional details for setting correlation rules are described below with respect to FIG. 3, in some embodiments. The correlation rules include rule ID information.

In operation 215, the received alarms are aggregated based on the correlation flag. In some embodiments, the alarms are aggregated based on at least one of domain of the received alarm, vendor of the received alarm, equipment type of the received alarm, classification of the received alarm, geographic area of the received alarm or other suitable criteria. In some embodiments, the aggregation is performed for each of the options above. In some embodiments, the aggregation is filtered such that only equipment having an alarm which satisfies each of the criteria of the aggregation are aggregated together. For example, in some embodiments where the aggregation criteria includes domain and equipment type, the operation 215 will aggregate equipment having alarms that share a domain and equipment type with the received alarm regardless of a vendor of the equipment. One of ordinary skill in the art would recognize that this description covers any combination of the above criteria for performing the aggregation of operation 215.

The domain of the received alarm indicates a type of communication protocol in which the impacted equipment operations. In some embodiments, the domain is radio access network (RAN), open RAN (ORAN), local access network (LAN), a data center, a cloud system or another suitable domain. Aggregating the alarms based domain helps to ensure that customers are able to reliably utilize communication protocols associated with their respective mobile device.

The vendor of the received alarm refers to a service provider for the telecommunication network. In some instances, communication towers include equipment from more than one service provider. Aggregating alarms based on vendor allows the network monitor to service multiple vendors simultaneously with a reduced risk of erroneously transmitting replace/repair incident report to an incorrect vendor.

The classification of the received alarm refers to the impact of the alarm for the piece of equipment. In some embodiments, options for the classification include outage, deterioration, notification, normal, or another suitable classification. An outage classification indicates that the equipment is non-operational. A deterioration classification indicates that the equipment is operation, but at a lower efficiency than normal. A notification classification indicates that the equipment is able to function at or near normal efficiency, but that an error is likely to occur. For example, a low battery or error corrections in a memory approaching capacity generates a notification alarm in some instances. A normal classification indicates that the equipment is operating at or near normal efficiency. Aggregating based on classification helps to prioritize replace/repair operations on equipment that is non-functional or functioning inefficiently.

The equipment type indicates a functionality of the equipment of the received alarm. In some embodiments, the equipment type includes routers, SPS equipment, transceivers, MME equipment, CGNAT equipment, or other suitable equipment. Aggregating based on equipment type helps to determine whether a replace/repair operation is able to be performed remotely. In addition, aggregating based on equipment type helps to ensure that a technician has the proper tools and parts to perform repair/replace operations.

The geographic area indicates a location of the equipment of the received alarm. In some embodiments, the geographic area includes the first geographic area 120 (FIG. 1) or the second geographic area 125 (FIG. 1). Aggregating based on geographic area helps to improve efficiency of replace/repair operations because technicians are able to reduce travel time between equipment during the replace/repair operations to return the telecommunication network to normal performance faster.

In operation 220, the aggregated alarms are associated with correlation rules received in operation 210. The rule ID is associated with each of the aggregated alarms relevant to the rule ID. By associating the rule IDs with the corresponding alarms, the method 200 is able to determine whether a mass outage has occurred based on the parameters set by the network monitor.

In operation 225, the alarms that are associated with the rule IDs are aggregated. In operation 225, the aggregation is performed based on rule ID, alarm codes, and geographic area of the alarms. Aggregating the alarms based on rule ID helps to determine how many pieces of equipment that are related together by a rule ID are experiencing problems. The rule ID also helps to relate the predetermined threshold values for the determining an importance level for an identified mass outage. Aggregating based on alarm codes helps to determine whether the alarms are likely stemming from a same cause. For example, a natural disaster causing a loss of power resulting in low battery alarms would produce a large number of alarms having a low battery alarm code. In another example, a natural disaster resulting in physical damage to the equipment is also likely to produce a large number of alarms having a same alarm code. In still another example, damage to a fiber optic cable connecting a data center to a number of nodes, e.g., nodes 110 (FIG. 1), would also likely produce a large number of alarms having a same alarm code. Aggregating based on geographic area also helps to improve efficiency of replace/repair operations because technicians are able to reduce travel time between equipment during the replace/repair operations to return the telecommunication network to normal performance faster.

In operation 230, a number of nodes in each of the aggregated combinations is determined. The number of nodes is determined based on the aggregation performed in operation 225.

In operation 235, the number of nodes in each of the aggregation combination is compared with a corresponding threshold values based on the mass outage rules corresponding to the rule IDs from the correlation rules. Each of the correlation rules has a rule ID and is associated with one or more threshold values determined by corresponding mass outage rules. In some embodiments, the threshold values are usable to determine both whether a mass outage has occurred and an importance level of an identified mass outage.

In operation 240, a determination is made whether the number of nodes in each of the aggregation combinations is greater than or equal to any of the threshold values from the corresponding mass outage rules. For example, in response to a determination that 10 nodes have alarms which satisfy rule ID 123 and a threshold value of determining a mass outage is 9 nodes for rule ID 123, the operation 240 will determine that a mass outage occurred. In contrast, in response to a determination that 7 nodes have alarms which satisfy rule ID 123 and a threshold value of determining a mass outage is 9 nodes for rule ID 123, the operation 240 will determine that no mass outage has occurred with respect to rule ID 123.

In some embodiments where the mass outage rules include multiple threshold values indicating different importance levels, the operation 240 determines an importance level of an identified mass outage. For example, in response to a determination that 15 nodes have alarms which satisfy rule ID 345; a threshold value for a major mass outage is 12 nodes; and a threshold value for a critical mass outage is 16 nodes, the operation 240 will determine that a mass outage occurred and that an importance level of the mass outage is major. In another example, in response to a determination that 30 nodes have alarms which satisfy rule ID 345; a threshold value for a critical mass outage is 16 nodes; and a threshold value for an emergency mass outage is 24 nodes, the operation 240 will determine that a mass outage occurred and that an importance level of the mass outage is emergency. Examples of correlation rules and associated mass outage rules having various threshold values for different importance levels is provided in FIG. 4, in some embodiments. One of ordinary skill in the art would recognize that different correlation rules and threshold values are within the scope of this disclosure.

In response to a determination that no mass outage has occurred, the method 200 returns to operations 205 and 210. In response to a determination that a mass outage has occurred, the method 200 proceeds to operation 245.

In operation 245, an incident report is generated in response to a determination that a mass outage has occurred. An incident report is generated for each rule ID having a number of nodes that is equal to or greater than a corresponding threshold value. In some embodiments, the incident report includes an importance value of the determined mass outage. In some embodiments, the independent report does not include an importance value of the determined mass outage. The incident report indicates which nodes and which equipment are having problems as well as the types of problems.

In some embodiments, the incident report is transmitted to a replace/repair technician for addressing the problems at the nodes that are part of the mass outage. In some embodiments, the incident report is transmitted to a network monitor for developing a response to the mass outage. In some embodiments, the incident report includes suggestions for addressing the mass outage. In some embodiments, the incident report is transmitted wirelessly to the technician or network monitor. In some embodiments, the incident report is transmitted through a wired connection to the technician or the network monitor. In some embodiments, the incident report is configured to cause a device controlled by the technician or network monitor, such as a mobile device, to generate an alert in response to receipt of the incident report. In some embodiments, the alert includes an audio alert or visual alert. In some embodiments, a type of alert generated at the device controlled by the technician or network monitor is based on an importance level of the mass outage. In some embodiments, a color of a visual alert indicates the importance level of the mass outage. In some embodiments, a lower importance level generates only a visual alert while a higher importance level generates both a visual alert and an audio alert.

In some embodiments, the method 200 implements the incident report differently depending on the importance level of the mass outage. For example, in some embodiments, an incident report for a mass outage having a minor importance level is transmitted to a single technician while an incident report for a mass outage having a critical importance level is transmitted to multiple technicians. A number of technicians that receive the incident report is based on a number of nodes to be replaced/repaired, in some embodiments. In some embodiments, an incident report for a mass outage having a major importance level is transmitted to one or more technicians while an incident report for a mass outage having an emergency importance level is transmitted to one or more technicians as well as a network monitor. One of ordinary skill in the art would recognize that different combinations of importance levels and incident report transmission are within the scope of this disclosure.

In some embodiments, the incident report is transmitted based on an alarm code associated with the rule ID associated with the mass outage. For example, in some embodiments, the rule ID indicates a problem that is able to be addressed remotely, such as by remotely resetting the equipment. In such a situation, the incident report is transmitted to a network monitor, in some embodiments. In some embodiments, the incident report is transmitted to the network monitor and the remote resetting signal is automatically transmitted to the equipment without interaction from the network monitor. In some embodiments, the rule ID indicates a problem that is only able to be addressed at the location of the equipment. In some embodiments, the incident report is transmitted to one or more technicians in response to a determination that the problem is only able to be addressed at the location of the equipment.

In some embodiments, the incident report includes an incident start time. The incident start time is a time stamp of an earliest alarm received which is part of the rule ID that resulted in a determination of a mass outage.

In some embodiments, the method 200 further includes receiving information from the technician or network monitor indicating progress for resolving the mass outage. In some embodiments, the method 200 is configured to determine an end time for an incident report in response to receiving information indicating that all equipment associated with the mass outage has been replaced/repaired. In some embodiments, the incident report will close automatically in response to receiving information that all equipment associated with the mass outage has been replaced/repaired. In some embodiments, an end time of the incident report is set to a time stamp at which confirmation of a last equipment associated with the incident report is replaced/repaired.

One of ordinary skill in the art would understand that the operations of method 200 are not limited to the operations described above or the order of the operations described above. In some embodiments, the method 200 includes at least one additional operation. For example, in some embodiments, the method 200 includes transmitting a notification to customers of the telecommunication network regarding an identified mass outage. In some embodiments, at least one operation of the method 200 is omitted. For example, in some embodiments, operation 235 is omitted and the comparison is made as part of operation 240. In some embodiments, an order of operations of the method 200 is adjusted. For example, in some embodiments, operations 215, 220 and 225 are combined into a single operation.

Figure 3:
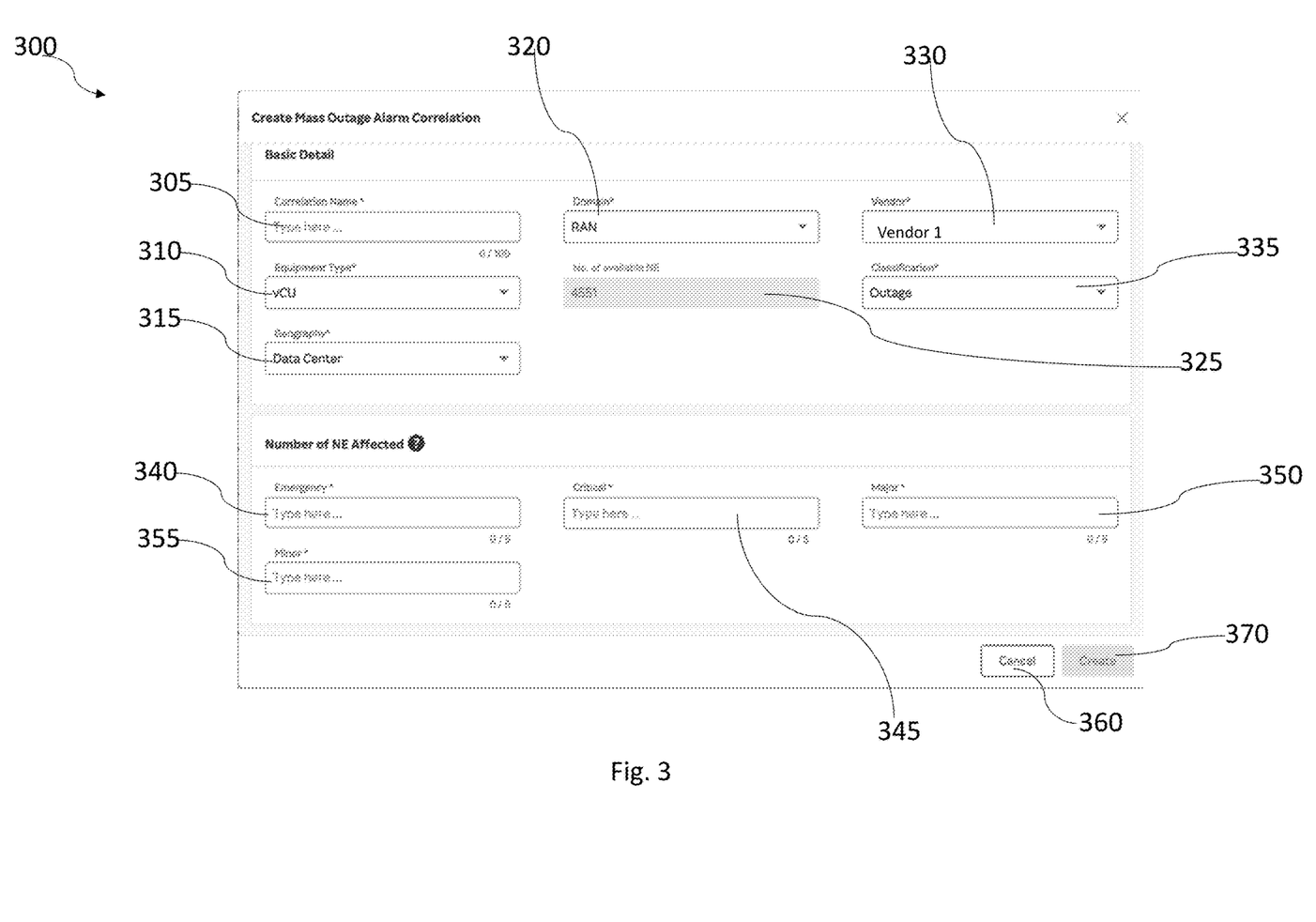
FIG. 3 is a graphical user interface (GUI) for receiving information to configure a mass outage in accordance with some embodiments.

FIG. 3 is a graphical user interface (GUI) 300 for receiving information for determining a mass outage in accordance with some embodiments. The GUI 300 is usable to receive information for establishing correlation rules and mass outage rules, such as those described with respect to method 200 (FIG. 2) or telecommunication network 100 (FIG. 1), in some embodiments. One of ordinary skill in the art would understand that information for establishing correlation rules and mass outage rules is also possible using an input/output (I/O) interface other than GUI 300. In some embodiments, the GUI 300 displayed on a touch screen. In some embodiments, the GUI 300 is configured to receive data from a user, such as a network monitor, touching a screen; using a mouse; using a keyboard; using speech; or using another suitable I/O device.

The GUI 300 includes a first field 305 for receiving name for a name of a correlation rule. The name of the correlation rule is usable as a rule ID, in some embodiments. In some embodiments, the rule ID is generated automatically and is different from the correlation rule name. The first field 305 is configured to receive text or numerical values. A user is able to enter a name for the correlation rule.

The GUI 300 further includes a second field 310 configured to receive an equipment type. In FIG. 3, the second field 310 is a drop down menu. In some embodiments, the second field 310 is configured to receive text or numerical values. The second field 310 includes a drop down menu of equipment types within a telecommunication network, such as telecommunication network 100 (FIG. 1). A user is able to select the equipment type from the list of available equipment in the telecommunication network. In some embodiments, the list of available equipment types is updated as new types of equipment are added into the telecommunication network. In some embodiment, the updating is performed automatically upon the telecommunication network detecting a new piece of equipment. In some embodiments, the updating is performed by the network monitor.

The GUI 300 further includes a third field 315 configured to receive geographic information. In FIG. 3, the third field 315 is a drop down menu. In some embodiments, the third field 315 is configured to receive text or numerical values. The third field 315 includes a drop down menu of geographic locations within the telecommunication network. In some embodiments, the drop down menu includes geographic areas, such as the first geographic area 120 (FIG. 1) or the second geographic area 125 (FIG. 1). In some embodiments, the drop down menu includes names of cities, towns, prefectures, or other areas. In some embodiments, the drop down menu includes other geographic area identifying information such as an identification number or name.

The GUI 300 further includes a fourth field 320 configured to receive information relate to a domain. In FIG. 3, the fourth field 320 is a drop down menu. In some embodiments, the fourth field 320 is configured to receive text or numerical values. The fourth field 320 includes a drop down menu of domains supported by a telecommunication network, such as telecommunication network 100 (FIG. 1). A user is able to select the domain from the list of available equipment in the telecommunication network. In some embodiments, the list of available domains is updated as new domains are added into the telecommunication network. In some embodiment, the updating is performed automatically. In some embodiments, the updating is performed by the network monitor.

The GUI 300 further includes a fifth field 325 configured to indicate a number of available pieces of equipment within the telecommunication network that satisfy the information entered into the other fields of the GUI 300. The fifth field 325 is automatically populated based on known equipment within the telecommunication network, such as telecommunication network 100 (FIG. 1).

The GUI 300 further includes a sixth field 330 configured to receive information related to a vendor. In FIG. 3, the sixth field 330 is a drop down menu. In some embodiments, the sixth field 330 is configured to receive text or numerical values. The sixth field 330 includes a drop down menu of vendors whose equipment is being monitored. A user is able to select the vendor from the list of available vendors in the telecommunication network. In some embodiments, the list of available vendors is updated as new vendors are added into the monitoring system. In some embodiment, the updating is performed automatically. In some embodiments, the updating is performed by the network monitor.

The GUI 300 further includes a seventh field 335 configured to receive information related to a vendor. In FIG. 3, the seventh field 335 is a drop down menu. In some embodiments, the seventh field 335 is configured to receive text or numerical values. The seventh field 335 includes a drop down menu of classifications of types of conditions of equipment. In some embodiments, the classifications include outage, deterioration, notification, normal, or other suitable classifications. A user is able to select the classification from the list of available classifications. In some embodiments, the list of available classifications is updated as new classifications are permitted by the monitoring system. In some embodiment, the updating is performed automatically. In some embodiments, the updating is performed by the network monitor.

Using the first field 305 through the seventh field 335, the network monitor is able to establish correlation rules that relate pieces of equipment within a telecommunication network, such as telecommunication network 100 (FIG. 1), with one another. These correlation rules are usable by the controller 130 (FIG. 1), the method 200 (FIG. 2), or other systems or methods to determine whether a mass outage has occurred within the telecommunication network.

The GUI 300 further includes an eighth field 340 configured to receive a numerical value indicating a threshold value for a number of pieces of equipment in the correlation rule defined by the first field 305 through the seventh field 335 to have an importance level of "emergency." The emergency threshold is the most critical type of mass outage in systems or methods using GUI 300. In some embodiments, the GUI 300 is configured to generate an alert indicating an unacceptable value in the eighth field 340 in response to the number of in the eighth field 340 exceeding the number in the fifth field 325.

The GUI 300 further includes a ninth field 345 configured to receive a numerical value indicating a threshold value for a number of pieces of equipment in the correlation rule defined by the first field 305 through the seventh field 335 to have an importance level of "critical." The critical threshold is the second most critical type of mass outage in systems or methods using GUI 300. In some embodiments, the GUI 300 is configured to generate an alert indicating an unacceptable value in the ninth field 345 in response to the number of in the ninth field 345 exceeding the number in the eighth field 340.

The GUI 300 further includes a tenth field 350 configured to receive a numerical value indicating a threshold value for a number of pieces of equipment in the correlation rule defined by the first field 305 through the seventh field 335 to have an importance level of "major." The major threshold is the third most critical type of mass outage in systems or methods using GUI 300. In some embodiments, the GUI 300 is configured to generate an alert indicating an unacceptable value in the tenth field 350 in response to the number of in the tenth field 350 exceeding the number in the ninth field 345.

The GUI 300 further includes an eleventh field 355 configured to receive a numerical value indicating a threshold value for a number of pieces of equipment in the correlation rule defined by the first field 305 through the seventh field 335 to have an importance level of "minor." The minor threshold is the least critical type of mass outage in systems or methods using GUI 300. In some embodiments, the GUI 300 is configured to generate an alert indicating an unacceptable value in the eleventh field 355 in response to the number of in the eleventh field 355 exceeding the number in the tenth field 350.

Using the eighth field 340 through the eleventh field 355, the network monitor is able to establish mass outage rules that determine a number pieces of equipment having alarms in a telecommunication network, such as telecommunication network 100 (FIG. 1), to generate an incident report having a corresponding importance value. These mass outage rules are usable by the controller 130 (FIG. 1), the method 200 (FIG. 2), or other systems or methods to assign an importance value a mass outage that has occurred within the telecommunication network.

The GUI 300 further includes a cancel button 360 configured to cause the fields of the GUI 300 to return to default values; or to close the GUI 300. The GUI 300 further includes a create button 370 configured to enter the correlation rule and mass outage rule defined by the fields of the GUI 300 into a system monitoring a telecommunication network, such as telecommunication network 100 (FIG. 1). In some embodiments, the above described alerts are generated in response to the user selecting the create button 370. In some embodiments, the GUI 300 is configured to generate an alert in response to the user failing to enter information into at least one of the fields of the GUI 300. One of ordinary skill in the art would recognize that a GUI include additional fields or alternative fields is within the scope of this description. For example, in some embodiments, a "notes" field is included in the GUI 300 to allow a user to enter notes regarding the correlation rule or mass outage rule defined by the values in the fields of the GUI 300.

Figure 4:
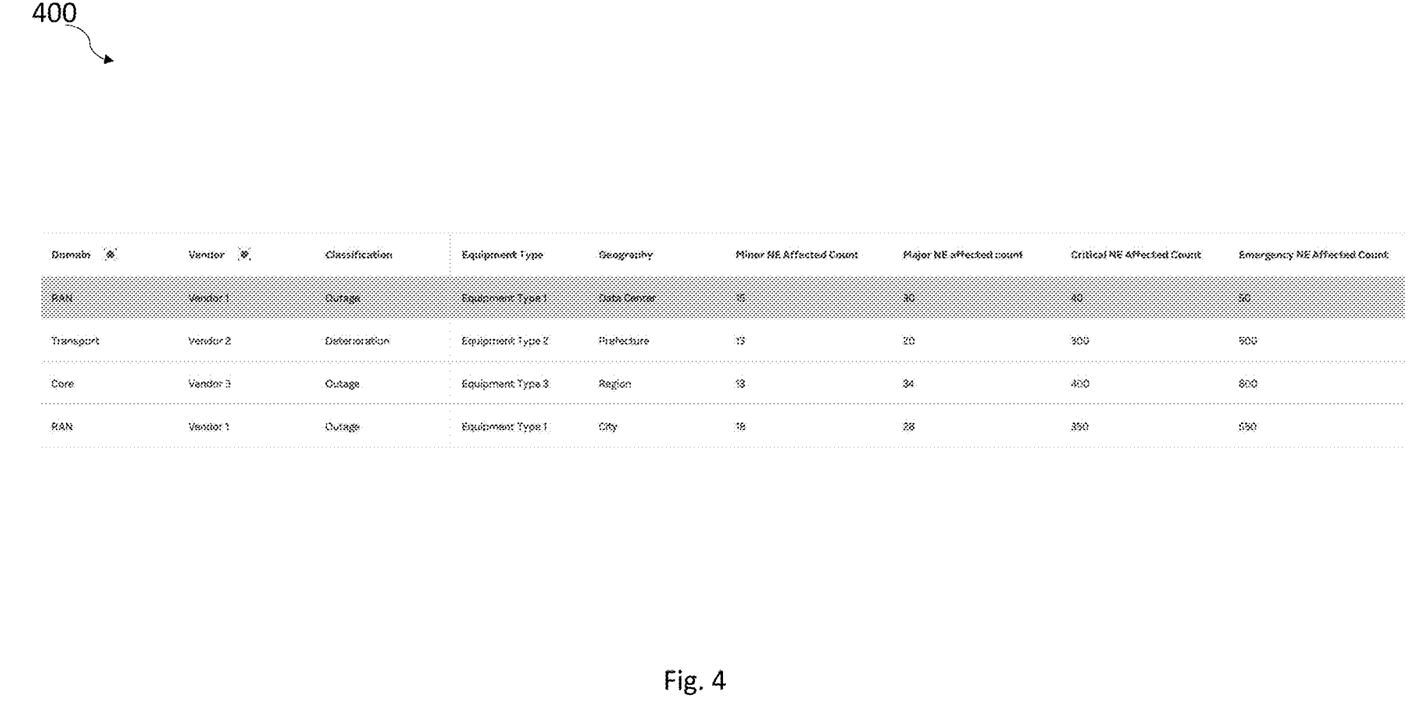
FIG. 4 is a table of correlation rules and threshold values for importance levels in accordance with some embodiments.

FIG. 4 is a table 400 of correlation rules and threshold values for importance levels in accordance with some embodiments. The table 400 is a visual representation of correlation rules and mass outage rules usable for monitoring a telecommunication network, such as telecommunication network 100 (FIG. 1). In some embodiments, the table 400 is generated based on information entered into GUI 300 (FIG. 3). In some embodiments, the table 400 is usable to implement the method 200 (FIG. 2). One of ordinary skill in the art would recognize that the table 400 is mere exemplary to assist in understanding this description and that different values within the table 400 are within the scope of this description.

The first three columns of the table 400 define equipment type, classification and geographic information for a correlation rule. The fourth through seventh columns of the table 400 define threshold values for different importance levels for the correlation rule. Each row of the table 400 defines a correlation rule and mass outage rule for determining whether to generate an incident report and an importance level of any generated incident report.

Figure 5:
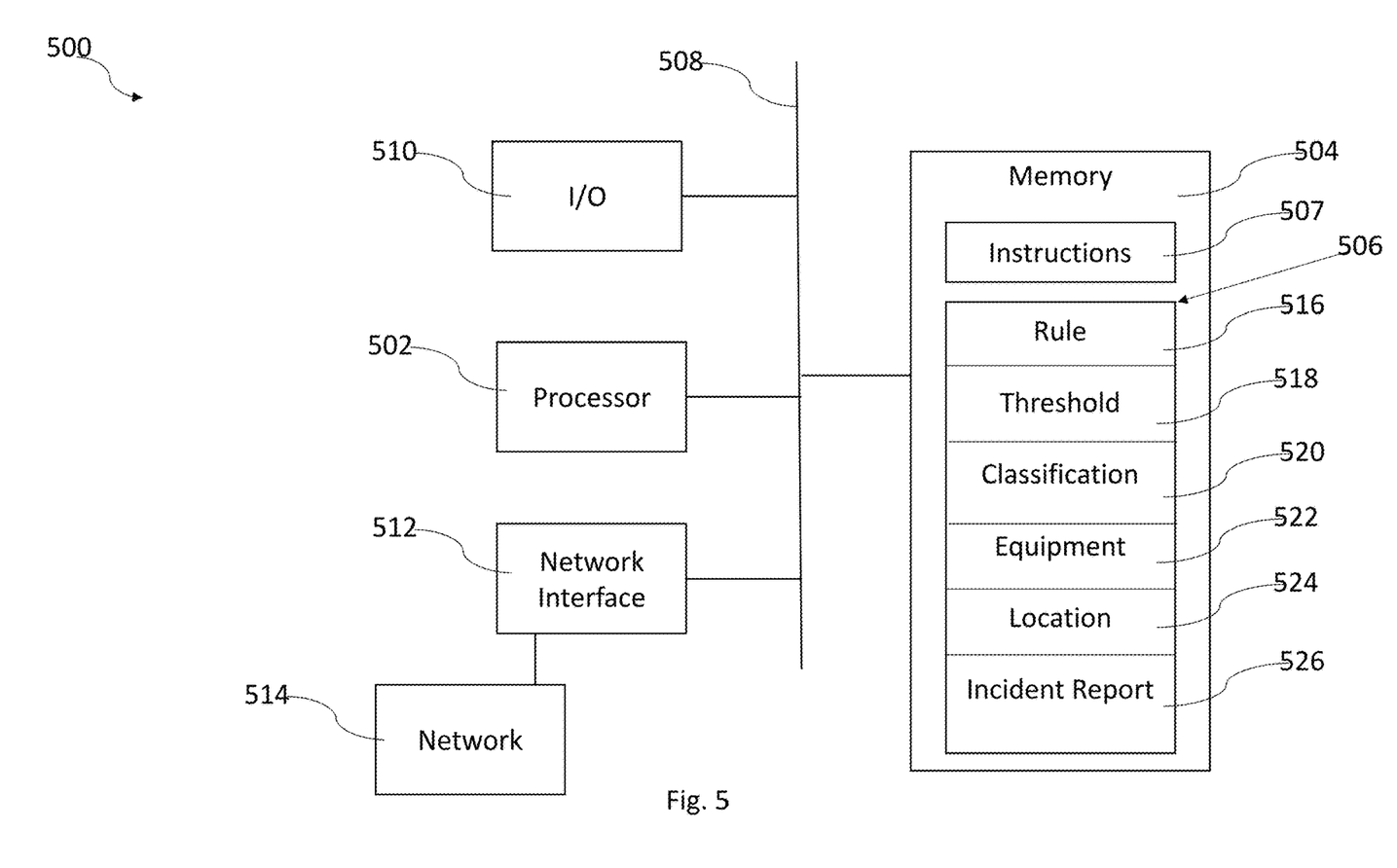
FIG. 5 is a block diagram of a system for determining a mass outage in accordance with some embodiments.

FIG. 5 is a block diagram of a system for determining a mass outage in accordance with some embodiments. System 500 includes a hardware processor 502 and a non-transitory, computer readable storage medium 504 encoded with, i.e., storing, the computer program code 506, i.e., a set of executable instructions. Computer readable storage medium 504 is also encoded with instructions 507 for interfacing with manufacturing machines for producing the memory array. The processor 502 is electrically coupled to the computer readable storage medium 504 via a bus 508. The processor 502 is also electrically coupled to an I/O interface 510 by bus 508. A network interface 512 is also electrically connected to the processor 502 via bus 508. Network interface 512 is connected to a network 514, so that processor 502 and computer readable storage medium 504 are capable of connecting to external elements via network 514. The processor 502 is configured to execute the computer program code 506 encoded in the computer readable storage medium 504 in order to cause system 500 to be usable for performing a portion or all of the operations as described with respect to telecommunication system 100 (FIG. 1) or method 200 (FIG. 2).

In some embodiments, the processor 502 is a central processing unit (CPU), a multi-processor, a distributed processing system, an application specific integrated circuit (ASIC), and/or a suitable processing unit.

In some embodiments, the computer readable storage medium 504 is an electronic, magnetic, optical, electromagnetic, infrared, and/or a semiconductor system (or apparatus or device). For example, the computer readable storage medium 504 includes a semiconductor or solid-state memory, a magnetic tape, a removable computer diskette, a random access memory (RAM), a read-only memory (ROM), a rigid magnetic disk, and/or an optical disk. In some embodiments using optical disks, the computer readable storage medium 504 includes a compact disk-read only memory (CD-ROM), a compact disk-read/write (CD-R/W), and/or a digital video disc (DVD).

In some embodiments, the storage medium 504 stores the computer program code 506 configured to cause system 500 to perform method 300 or method 400. In some embodiments, the storage medium 504 also stores information for performing a portion or all of the operations as described with respect to telecommunication system 100 (FIG. 1) or method 200 (FIG. 2) as well as information generated during performing a portion or all of the operations as described with respect to telecommunication system 100 (FIG. 1) or method 200 (FIG. 2), such as a rule parameter 516, a threshold parameter 518, a classification parameter 520, an equipment type parameter 522, a location parameter 524, an incident report parameter 526 and/or a set of executable instructions to perform a portion or all of the operations as described with respect to telecommunication system 100 (FIG. 1) or method 200 (FIG. 2).

In some embodiments, the storage medium 504 stores instructions 507 for interfacing with external devices including equipment within the telecommunication network. The instructions 507 enable processor 502 to generate instructions readable by the external devices to effectively implement a portion or all of the operations as described with respect to telecommunication system 100 (FIG. 1) or method 200 (FIG. 2).

System 500 includes I/O interface 510. I/O interface 510 is coupled to external circuitry. In some embodiments, I/O interface 510 includes a keyboard, keypad, mouse, trackball, trackpad, and/or cursor direction keys for communicating information and commands to processor 502.

System 500 also includes network interface 512 coupled to the processor 502. Network interface 512 allows system 500 to communicate with network 514, to which one or more other computer systems are connected. Network interface 512 includes wireless network interfaces such as BLUETOOTH, WIFI, WIMAX, GPRS, or WCDMA; or wired network interface such as ETHERNET, USB, or IEEE-1394. In some embodiments, a portion or all of the operations as described with respect to telecommunication system 100 (FIG. 1) or method 200 (FIG. 2) is implemented in two or more systems 500, and information is exchanged between different systems 500 via network 514.

An aspect of this description relates to a system. The system includes a non-transitory computer readable medium configured to store instructions thereon. The system further includes a processor connected to the non-transitory computer readable medium. The processor is configured to execute the instructions for receiving alarm data, wherein the alarm data is related to equipment in a telecommunication network. The processor is further configured to execute the instructions for receiving at least one correlation rule. The processor is further configured to execute the instructions for receiving at least one mass outage rule, wherein each mass outage rule of the at least one mass outage rule is associated with a corresponding correlation rule of the at least one correlation rule. The processor is further configured to execute the instructions for performing a first aggregation using the received alarm data based on at least one of domain, vendor, equipment type, classification, or geographic information. The processor is further configured to execute the instructions for associating each of the aggregated alarm data with a corresponding correlation rule of the at least one correlation rule. The processor is further configured to execute the instructions for determining a number of pieces of equipment in the telecommunication network that are associated with each of the at least one correlation rule. The processor is further configured to execute the instructions for determining whether the determined number of pieces of equipment is equal to or greater than at least one threshold value based on the mass outage rule. The processor is further configured to execute the instructions for generating an incident report in response to the number of pieces of equipment being equal to or greater than the at least one threshold value. In some embodiments, the processor is further configured to execute the instructions for wirelessly transmitting the generated incident report to a device controllable by a repair technician. In some embodiments, the processor is configured to execute the instructions for generating the incident report including an importance level of a mass outage. In some embodiments, the processor is configured to execute the instructions for determining the importance level of the mass outage based on the determined number of pieces of equipment. In some embodiments, the processor is configured to execute the instructions for performing a second aggregation using the number of pieces of equipment in the telecommunication network based on the at least one correlation rule, alarm codes of the received alarm data, and geographic information. In some embodiments, the processor is configured to execute the instructions for determining the number of pieces of equipment in the telecommunication network associated with each of the at least one correlation rule based on results of the second aggregation. In some embodiments, the processor is configured to execute the instructions for performing the first aggregation based on equipment type, classification, and geographic information.

An aspect of this description relates to a method. The method includes receiving alarm data, wherein the alarm data is related to equipment in a telecommunication network. The method further includes receiving at least one correlation rule. The method further includes receiving at least one mass outage rule, wherein each mass outage rule of the at least one mass outage rule is associated with a corresponding correlation rule of the at least one correlation rule. The method further includes performing a first aggregation using the received alarm data based on at least one of domain, vendor, equipment type, classification, or geographic information. The method further includes associating each of the aggregated alarm data with a corresponding correlation rule of the at least one correlation rule. The method further includes determining a number of pieces of equipment in the telecommunication network that are associated with each of the at least one correlation rule. The method further includes determining whether the determined number of pieces of equipment is equal to or greater than at least one threshold value based on the mass outage rule. The method further includes generating an incident report in response to the number of pieces of equipment being equal to or greater than the at least one threshold value. In some embodiments, the method further includes wirelessly transmitting the generated incident report to a device controllable by a repair technician. In some embodiments, generating the incident report includes generating the incident report including an importance level of a mass outage. In some embodiments, the method further includes determining the importance level of the mass outage based on the determined number of pieces of equipment. In some embodiments, the method further includes performing a second aggregation using the number of pieces of equipment in the telecommunication network based on the at least one correlation rule, alarm codes of the received alarm data, and geographic information. In some embodiments, the method further includes determining the number of pieces of equipment in the telecommunication network associated with each of the at least one correlation rule based on results of the second aggregation. In some embodiments, performing the first aggregation includes performing the first aggregation based on equipment type, classification, and geographic information.

An aspect of this description relates to a telecommunication system. The telecommunication system includes a plurality of nodes, wherein each of the plurality of nodes includes at least one piece of equipment. The telecommunication system includes a controller connected to each of the plurality of nodes. The controller includes a non-transitory computer readable medium configured to store instructions thereon. The controller further includes a processor connected to the non-transitory computer readable medium. The processor is configured to execute the instructions for receiving alarm data, wherein the alarm data is related to the plurality of nodes. The processor is further configured to execute the instructions for receiving at least one correlation rule. The processor is further configured to execute the instructions for receiving at least one mass outage rule, wherein each mass outage rule of the at least one mass outage rule is associated with a corresponding correlation rule of the at least one correlation rule. The processor is further configured to execute the instructions for performing a first aggregation using the received alarm data for the plurality of nodes based on at least one of domain, vendor, equipment type, classification, or geographic information. The processor is further configured to execute the instructions for associating each of the aggregated alarm data with a corresponding correlation rule of the at least one correlation rule. The processor is further configured to execute the instructions for determining a number of nodes of the plurality of nodes that are associated with each of the at least one correlation rule. The processor is further configured to execute the instructions for determining whether the determined number of nodes is equal to or greater than at least one threshold value based on the mass outage rule. The processor is further configured to execute the instructions for generating an incident report in response to the number of nodes being equal to or greater than the at least one threshold value. In some embodiments, the processor is further configured to execute the instructions for wirelessly transmitting the generated incident report to a device controllable by a repair technician. In some embodiments, a first node of the plurality of nodes has a different base station type from a second node of the plurality of nodes. In some embodiments, each of the plurality of nodes had a same base station type. In some embodiments, the processor is configured to execute the instructions for receiving the at least one mass outage rule comprising a plurality of threshold values, wherein the at least one threshold value is one of the plurality of threshold values; and determining an importance value of a mass outage based on the plurality of threshold values; and generating the incident report including the determined importance value. In some embodiments, the processor is configured to execute the instructions for performing a second aggregation using the number of pieces of equipment in the telecommunication network based on the at least one correlation rule, alarm codes of the received alarm data, and geographic information.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A system for determining a mass outage in a network, the system comprising:
   a non-transitory computer readable medium configured to store instructions thereon; and
   a processor connected to the non-transitory computer readable medium, wherein the processor is configured to execute the instructions for:
   receiving alarm data, wherein the alarm data is related to equipment in a telecommunication network;
   receiving at least one correlation rule, wherein each of the at least one correlation rule is associated with a corresponding rule identification (ID);
   receiving at least one mass outage rule, wherein each mass outage rule of the at least one mass outage rule is associated with a correlation rule of the at least one correlation rule using the rule ID;
   performing a first aggregation using the received alarm data based on at least one parameter selected from the group consisting of a domain, and a vendor;
   associating each of the aggregated alarm data with a corresponding correlation rule of the at least one correlation rule;
   determining a number of pieces of equipment in the telecommunication network that are associated with each of the at least one correlation rule;

determining whether the determined number of pieces of equipment is equal to or greater than at least one threshold value, wherein the at least one threshold value is specified by a mass outage rule corresponding to the rule ID of the corresponding correlation rule;

automatically generating an incident report in response to the determined number of pieces of equipment being equal to or greater than the at least one threshold value;

identifying a piece of equipment from the number of pieces of equipment for remote resetting based on the rule ID; and wirelessly transmitting a resetting signal to the piece of equipment for resetting the piece of equipment.

2. The system according to claim 1, wherein the processor is configured to execute the instructions for generating the incident report including an importance level of the mass outage.

3. The system according to claim 2, wherein the processor is configured to execute the instructions for:

determining the importance level of the mass outage based on the determined number of pieces of equipment;

automatically determining a number of recipients of the incident report, wherein the number of recipients of the incident report is based on the importance level.

4. The system according to claim 1, wherein the processor is configured to execute the instructions for performing a second aggregation using the associated aggregated alarm data and corresponding correlated rule based on the rule ID of the at least one correlation rule, alarm codes of the received alarm data, and geographic information.

5. The system according to claim 4, wherein the processor is configured to execute the instructions for determining the number of pieces of equipment in the telecommunication network that are associated with each of the at least one correlation rule based on results of the second aggregation.

6. The system according to claim 1, wherein the processor is configured to execute the instructions for performing the first aggregation based on equipment type, classification, and geographic information.

7. A method of determining a mass outage in a network, the method comprising:

receiving alarm data, wherein the alarm data is related to equipment in a telecommunication network;

receiving at least one correlation rule, wherein each of the at least one correlation rule is associated with a corresponding rule identification (ID);

receiving at least one mass outage rule, wherein each mass outage rule of the at least one mass outage rule is associated with a correlation rule of the at least one correlation rule using the rule ID;

performing a first aggregation using the received alarm data based on at least one parameter selected from the group consisting of a domain, and a vendor;

associating each of the aggregated alarm data with a corresponding correlation rule of the at least one correlation rule;

determining a number of pieces of equipment in the telecommunication network that are associated with each of the at least one correlation rule;

determining whether the determined number of pieces of equipment is equal to or greater than at least one threshold value, wherein the at least one threshold value is specified by a mass outage rule corresponding to the rule ID of the corresponding correlation rule;

automatically generating an incident report based on the determination of whether the determined number of pieces of equipment is equal to or greater than the at least one threshold value;

identifying a piece of equipment from the number of pieces of equipment for remote resetting based on the rule ID; and wirelessly transmitting a resetting signal to the piece of equipment for resetting the piece of equipment.

8. The method according to claim 7, wherein generating the incident report comprises generating the incident report including an importance level of the mass outage.

9. The method according to claim 8, further comprising:

determining the importance level of the mass outage based on the determined number of pieces of equipment;

automatically determining a number of recipients of the incident report, wherein the number of recipients of the incident report is based on the importance level.

10. The method according to claim 7, further comprising performing a second aggregation using the associated aggregated alarm data and corresponding correlated rule based on a rule ID of the at least one correlation rule, alarm codes of the received alarm data, and geographic information.

11. The method according to claim 10, further comprising determining the number of pieces of equipment in the telecommunication network that are associated with each of the at least one correlation rule based on results of the second aggregation.

12. The method according to claim 7, wherein performing the first aggregation comprises performing the first aggregation based on equipment type, classification, and geographic information.

13. A telecommunication system capable of detecting a mass outage, the telecommunication system comprising:

a plurality of nodes, wherein each of the plurality of nodes comprises at least one piece of equipment; and a controller connected to each of the plurality of nodes, wherein the controller comprises:

a non-transitory computer readable medium configured to store instructions thereon; and a processor connected to the non-transitory computer readable medium, wherein the processor is configured to execute the instructions for:

receiving alarm data, wherein the alarm data is related to the plurality of nodes;

receiving at least one correlation rule, wherein each of the at least one correlation rule is associated with a corresponding rule identification (ID);

receiving at least one mass outage rule, wherein each mass outage rule of the at least one mass outage rule is associated with a correlation rule of the at least one correlation rule using the rule ID;

performing a first aggregation using the received alarm data for the plurality of nodes based on at least one parameter selected from the group consisting of a domain, and a vendor;

associating each of the aggregated alarm data with a corresponding correlation rule of the at least one correlation rule;

determining a number of nodes of the plurality of nodes that are associated with each of the at least one correlation rule;

determining whether the determined number of nodes is equal to or greater than at least one threshold value, wherein the at least one threshold value is specified by a mass outage rule corresponding to the rule ID of the corresponding correlation rule;
automatically generating an incident report in response to the determined number of nodes being equal to or greater than the at least one threshold value;
identifying a piece of equipment from the number of pieces of equipment for remote resetting based on the rule ID; and
wirelessly transmitting a resetting signal to the piece of equipment for resetting the piece of equipment.

14. The telecommunication system according to claim 13, wherein a first node of the plurality of nodes has a different base station type from a second node of the plurality of nodes.

15. The telecommunication system according to claim 13, wherein each of the plurality of nodes has a same base station type.

16. The telecommunication system according to claim 13, wherein the processor is configured to execute the instructions for:
receiving the at least one mass outage rule, each of the at least one mass outage rule comprising a plurality of threshold values, wherein the at least one threshold value is one of the plurality of threshold values; and
determining an importance value of the mass outage based on the plurality of threshold values; and
generating the incident report including the determined importance value.

17. The telecommunication system according to claim 13, wherein the processor is configured to execute the instructions for performing a second aggregation using the associated aggregated alarm data and corresponding correlated rule based on a rule ID of the at least one correlation rule, alarm codes of the received alarm data, and geographic information.

* * * * *